(12) United States Patent
Onozawa et al.

(10) Patent No.: US 12,325,444 B2
(45) Date of Patent: Jun. 10, 2025

(54) MOBILE WARNING APPARATUS

(71) Applicant: DENSO CORPORATION, Kariya (JP)

(72) Inventors: Masato Onozawa, Kariya (JP); Mai Sakamoto, Kariya (JP); Hiroki Hori, Kariya (JP)

(73) Assignee: DENSO CORPORATION, Kariya (JP)

( * ) Notice: Subject to any disclaimer, the term of this patent is extended or adjusted under 35 U.S.C. 154(b) by 224 days.

(21) Appl. No.: 17/660,163

(22) Filed: Apr. 21, 2022

(65) Prior Publication Data

US 2022/0242439 A1    Aug. 4, 2022

Related U.S. Application Data

(63) Continuation of application No. PCT/JP2020/039437, filed on Oct. 20, 2020.

(30) Foreign Application Priority Data

Oct. 25, 2019   (JP) .................................. 2019-194309

(51) Int. Cl.
*B60W 50/16* (2020.01)
*B60W 40/04* (2006.01)
*B60W 50/14* (2020.01)

(52) U.S. Cl.
CPC ............ *B60W 50/16* (2013.01); *B60W 40/04* (2013.01); *B60W 2050/146* (2013.01); *B60W 2420/408* (2024.01); *B60W 2554/4044* (2020.02)

(58) Field of Classification Search
CPC ................. B60W 50/16; B60W 40/04; B60W 2554/4044; B60W 2420/408; B60W 2050/146

USPC .......................................................... 701/117
See application file for complete search history.

(56) References Cited

U.S. PATENT DOCUMENTS

| | | | |
|---|---|---|---|
| 9,372,261 B2* | 6/2016 | Aoki | G01S 7/354 |
| 2004/0222887 A1 | 11/2004 | Tsuj | |
| 2005/0242985 A1* | 11/2005 | Ponsford | G01S 13/87 |
| | | | 342/107 |
| 2010/0033364 A1* | 2/2010 | Kishida | G01S 13/584 |
| | | | 342/70 |
| 2014/0025285 A1* | 1/2014 | Trombley | G08G 1/161 |
| | | | 701/301 |
| 2015/0186569 A1 | 7/2015 | Sekine et al. | |
| 2016/0291149 A1* | 10/2016 | Zeng | G01S 13/874 |
| 2017/0116461 A1* | 4/2017 | Kakita | G06V 10/762 |
| 2017/0291602 A1* | 10/2017 | Newman | B60W 10/18 |
| 2019/0143925 A1 | 5/2019 | Akamine et al. | |

(Continued)

FOREIGN PATENT DOCUMENTS

| | | |
|---|---|---|
| JP | 2010257229 A | 11/2010 |
| JP | 2019132610 A | 8/2019 |
| JP | 2019-194309 A | 11/2019 |

*Primary Examiner* — Hunter B Lonsberry
*Assistant Examiner* — Helen Li
(74) *Attorney, Agent, or Firm* — Maschoff Brennan

(57) ABSTRACT

A mobile warning apparatus according to one aspect of the present disclosure includes a velocity calculator, a position determiner, and an eliminator. The velocity calculator calculates one or more relative velocities of one or more observed points. The position determiner determines whether the observed points are in a predetermined proximity extent. The eliminator eliminates, in response to determination that the observed points are in the predetermined proximity extent, all the observed points from a warning target.

5 Claims, 16 Drawing Sheets

(56) References Cited

U.S. PATENT DOCUMENTS

2019/0293778 A1\* 9/2019 Akamine ............. G01S 13/931
2020/0371228 A1\* 11/2020 Wang .................... G06V 20/56

\* cited by examiner

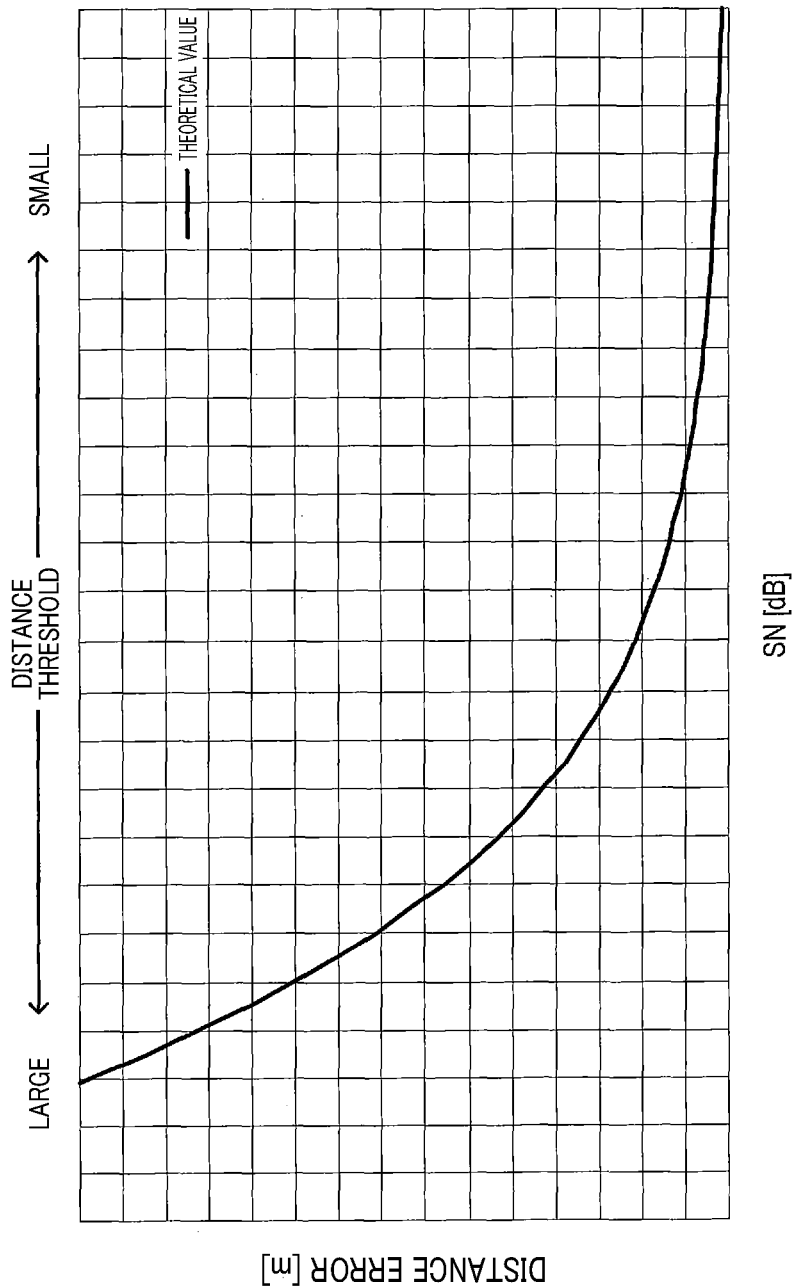

MOBILE WARNING APPARATUS

CROSS-REFERENCE TO RELATED APPLICATION

The present application is a bypass continuation application of a currently pending international application No. PCT/JP2020/039437 filed on Oct. 20, 2020 designating the United States of America, the entire disclosure of which is incorporated herein by reference, the international application being based on and claiming the benefit of priority of each of Japanese Patent Application No. 2019-194309 filed on Oct. 25, 2019. The disclosure of the Japanese Patent Application No. 2019-194309 is incorporated in its entirety in the internal application by reference.

TECHNICAL FIELD

The present disclosure relates to technologies for observing one or more mobile objects approaching a vehicle.

BACKGROUND

A known estimation apparatus estimates a future trajectory of an object in accordance with an estimated moving direction and an estimated relative velocity of the object.

SUMMARY

A mobile warning apparatus according to one aspect of the present disclosure includes a velocity calculator, a position determiner, and an eliminator. The velocity calculator calculates one or more relative velocities of one or more observed points. The position determiner determines whether the observed points are in a predetermined proximity extent. The eliminator eliminates, in response to determination that the observed points are in the predetermined proximity extent, all the observed points from a warning target.

BRIEF DESCRIPTION OF THE DRAWINGS

FIG. 22 is a graph illustrating how errors of distances of respective observed points are changed with change of signal-to-noise ratios of the respective observed points.

DETAILED DESCRIPTION OF EMBODIMENTS

Figure 1:
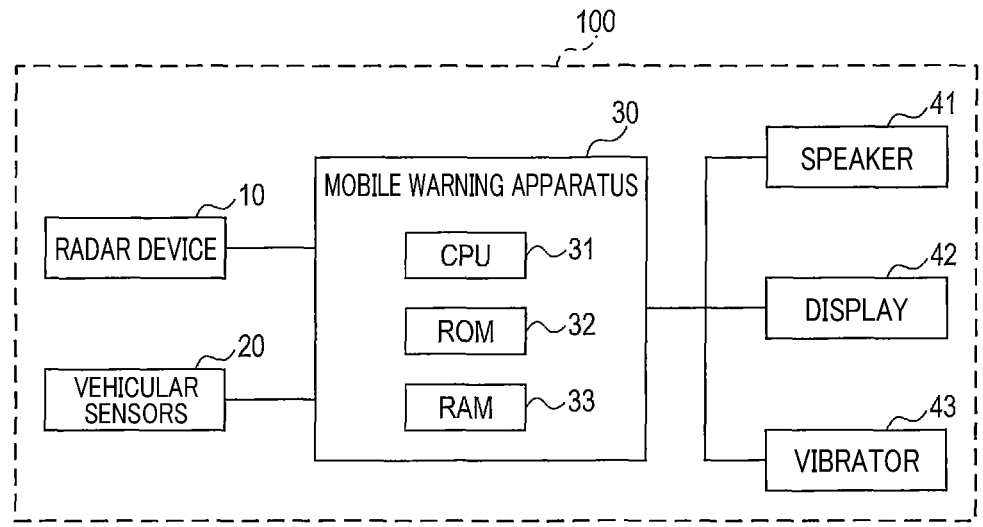
FIG. 1 is a block diagram illustrating the configuration of a cruise-assist system according to the first embodiment.

An estimation apparatus disclosed in Japanese Patent Application Publication No. 2017-201279 performs a first task of estimating a moving direction of an object located around a vehicle and a relative velocity of the object relative to the vehicle. Next, the estimation apparatus performs a second task of estimating, based on the estimated moving direction and relative velocity of the object, a future trajectory of the object. In addition, the estimation apparatus performs a third task of estimating a future trajectory of the vehicle in accordance with information about the vehicle, Then, the estimation apparatus performs a fourth task of determining whether the future trajectory of the object intersects the future trajectory of the vehicle, and issues a warning in response to determination that the future trajectory of the object intersects the future trajectory of the vehicle.

The creators, each of which has created the present disclosure, have considered in detail such a sequence of the first to fourth tasks in various situation. As a result of the detailed consideration, the creators have found that a rotor, such as an outdoor condenser unit, may appear to be an approaching object that approaches the vehicle depending on the location of the rotating machine and the relative velocity of the rotating machine relative to the vehicle; the location and the relative velocity are observed by one or more sensors installed in the vehicle.

A result of additional detailed consideration of the finding, the creators have found that the estimation apparatus may erroneously recognize such a fixed rotor as a mobile object approaching the vehicle, and perform unnecessary issuance of warnings indicative of the recognition of the approaching mobile object.

An aspect of the present disclosure preferably provides a technology, which reduces unnecessary issuance of warnings.

A mobile warning apparatus according to an exemplary aspect of the present disclosure includes a mobile warning apparatus for issuing a warning in response to observation of a mobile object approaching a vehicle. The mobile warning apparatus includes a velocity calculator configured to calculate, based on observation information observed by a sensor installed in the vehicle, one or more relative velocities of one or more observed points. The mobile warning apparatus includes a position determiner configured to determine whether the observed points are in a predetermined proximity extent, i.e., a predetermined proximity range or region. The mobile warning apparatus includes an eliminator configured to eliminate, in response to determination that the observed points are in the predetermined proximity extent, all the observed points from a warning target.

The mobile warning apparatus according to the exemplary aspect is configured to determine, in response to determination that relative velocities are calculated based on observation information observed by the sensor, whether observed points corresponding to the respective observed relative velocities are in a predetermined proximity extent. Because a rotor has plural velocity components, if the sensor observes a fixed object equipped with a rotor, relative velocities of respective observed points that are close to each other are calculated.

For this reason, in response to determination that the observed points are in the predetermined proximity extent, the mobile warning apparatus determines that there is a fixed object equipped with the rotor. The mobile warning apparatus therefore eliminates all of these observed points caused by the rotor from a warning target to accordingly reduce unnecessary issuance of a warning.

First Embodiment

The following describes a first embodiment of the present disclosure with reference to the accompanying drawings.

Configuration

The following describes the configuration of a cruise-assist system 100 according to the exemplary embodiment with reference to FIG. 1.

Referring to FIG. 1, a cruise-assist system 100 includes a radar device 10, vehicular sensors 20, a mobile warning apparatus 30, a speaker 41, a display 42, and vibrators 43.

The radar device 10 is mounted at, for example, at least one of the center front of a vehicle 50, the center rear of the vehicle 50, the left side of the front of the vehicle 50, the right side of the front of the vehicle 50, the left side of the rear of the vehicle 50, and the right side of the rear of the vehicle 50.

The radar device 10 of the exemplary embodiment is mounted at the center rear of the vehicle 50.

The radar device 10 is designed as a millimeter-wave radar employing at least one of available various observation modes, such as a known FMCW mode and a known dual FCW mode. FMCW is an abbreviation for Frequency Modulated Continuous Wave, and FCW is an abbreviation for Frequency Continuous Wave. In particular, the radar device 10 is designed as a millimeter-wave radar employing the dual FCW mode.

The radar device 10 cyclically performs an observation task, i.e., a monitoring task, of
(i) Transmitting radar-wave signals, and receiving echo signals from respective observed points using an array antenna
(ii) Manipulating the received echo signals to accordingly generate beat signals to accordingly perform frequency analysis processing for each of the beat signals to accordingly calculate a frequency-power spectrum of each of the beat signals; the frequency-power spectrum of each beat signal includes a relative velocity, a distance, and an azimuth of a corresponding observed point relative to the vehicle 50

The radar device 10 outputs, to the mobile warning apparatus 30, the frequency-power spectrum of each beat signal as observation information.

The vehicular sensors 20 include, for example, a vehicle speed sensor and a yaw rate sensor. The vehicle speed sensor is configured to measure the speed of the vehicle 50, and the yaw rate sensor is configured to measure the yaw rate of the vehicle 50. Each of the vehicular sensors 20 is configured to output, to the mobile warning apparatus 30 a measurement signal related to a corresponding measured physical value, such as the measured speed and the measured yaw rate.

The vibrators 43 are respectively mounted to, for example, a steering wheel and a seat of the vehicle 50. Each of the vibrators 43 is configured to apply vibrations to the corresponding one of the steering wheel and the seat.

The speaker 41 and the display 42 are installed in the compartment of the vehicle 50.

The mobile warning apparatus 30 is designed mainly as a microcomputer comprised of a CPU 31, a ROM 32, a RAM 33, an I/O interface, and other peripheral devices.

The CPU 31 executes programs stored in a nonvolatile tangible storage medium, such as the ROM 32, to thereby implement various functional units including a velocity calculator, a location deter miner, and an eliminator.

Figure 2:
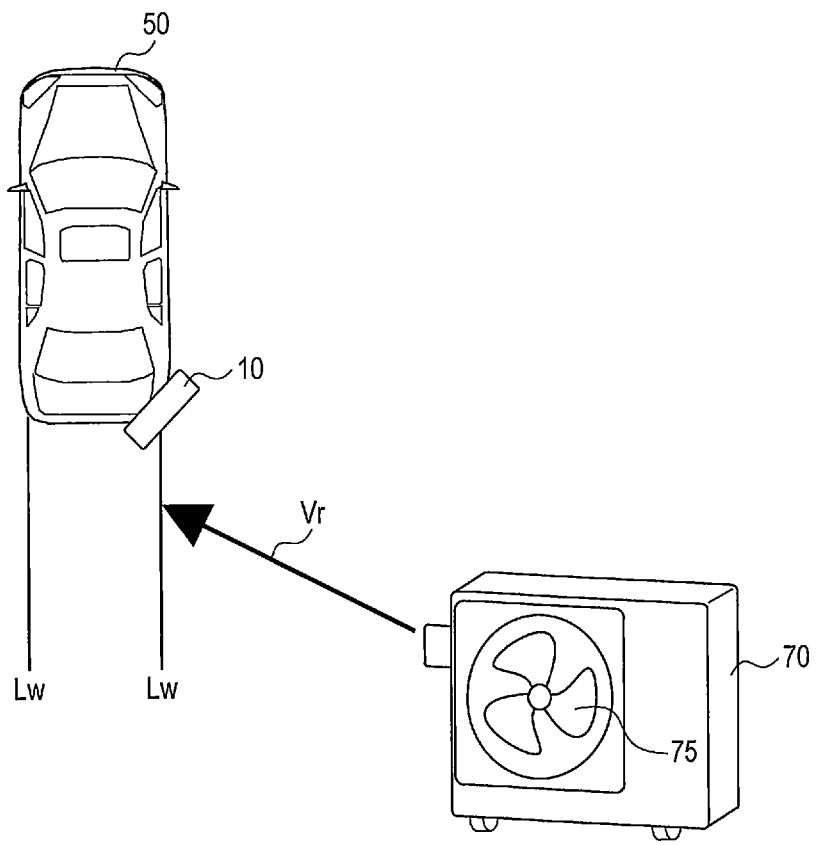
FIG. 2 is a view illustrating a situation where a velocity vector of an outdoor condenser unit intersects at least one warning line of a vehicle.

Referring to FIG. 2, the mobile warning apparatus 30 is configured to define, based on the measured speed and yaw rate of the vehicle 50, a pair of warning lines Lw respectively extending rearward from both ends of the rear of the vehicle 50. The mobile warning apparatus 30 is configured to estimate, based on the observation information sent from the radar device 10, a velocity vector of at least one mobile object located around the vehicle 50.

Additionally, the mobile warning apparatus 30 is configured to determine whether the estimated velocity vector of the at least one mobile object intersects at least one of the warning lines Lw, and instruct at least one of the speaker 41, display 42, and vibrators 43 to issue a corresponding warning in response to determination that the estimated velocity vector of the at least one mobile object intersects at least one of the warning lines Lw.

For example, the at least one mobile object includes at least one other vehicle approaching the vehicle 50 from the rear side thereof.

Specifically, each of the speaker 41, display 42, and vibrators 43 is configured to issue corresponding warning information in response to receiving an issuance instruction sent from the mobile warning apparatus 30 to thereby alert a driver of the vehicle 50 to the approaching mobile object.

Specifically, the speaker 41 is configured to issue a voice message and/or warning tones as the warning information, and the display 42 is configured to display visible information as the warning information. Each of the vibrators 43 is configured to cause vibrations as the warning information.

The mobile warning apparatus 30 is configured to perform an elimination routine that eliminates, from the observed points, as least one improper observed point which is observed, i.e., detected from an improper warning target.

Referring to FIG. 2, let us assume a situation where an outdoor condenser unit 70 is located close to the vehicle 50. The outdoor condenser unit 70 includes a fan 75.

In this situation, the radar device 10 may receive echo signals resulting from reflection of the transmitted radar-wave signals by plural portions of the fan 75 of the outdoor condenser unit 70.

Figure 3:
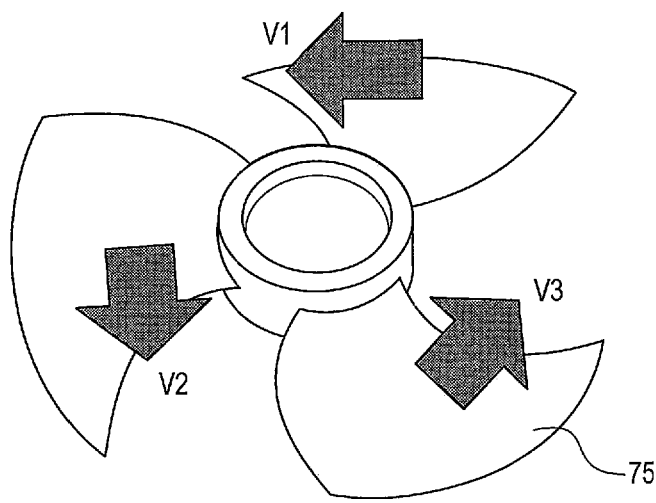
FIG. 3 is a perspective view illustrating plural velocity vectors that a rotor has.

Because the fan 75 is, as illustrated in FIG. 3, configured as a rotor, the fan 75 has plural velocity components in respective different directions. For this reason, relative velocities, which are respectively observed from the echo signals generated from the fan 75, may include at least one relative velocity in a direction approaching the vehicle 50.

The locations of at least one observed point that has a relative velocity in the direction approaching the vehicle 50 observed in respective observation cycles may vary due to observation error. This may result in the at least one observed point appearing to move toward the vehicle 50. In this situation, the cruise-assist system 100 may issue an unnecessary warning indicative of the at least one observed point that appears to approach the vehicle 50.

From this viewpoint, the mobile warning apparatus 30 is configured to perform the elimination routine that determines whether at least one observed point results from a rotor whose location is fixed, i.e., a stationary rotor, and eliminates the at least one observed point as least one improper observed point from an improper warning target in response to determination that the at least one observed point results from a rotor whose location is fixed. Specifically, the mobile warning apparatus 30 is configured to determine whether at least one observed point results from a rotor whose location is fixed in accordance with features of a rotor.

Features of Rotor

Figure 4:
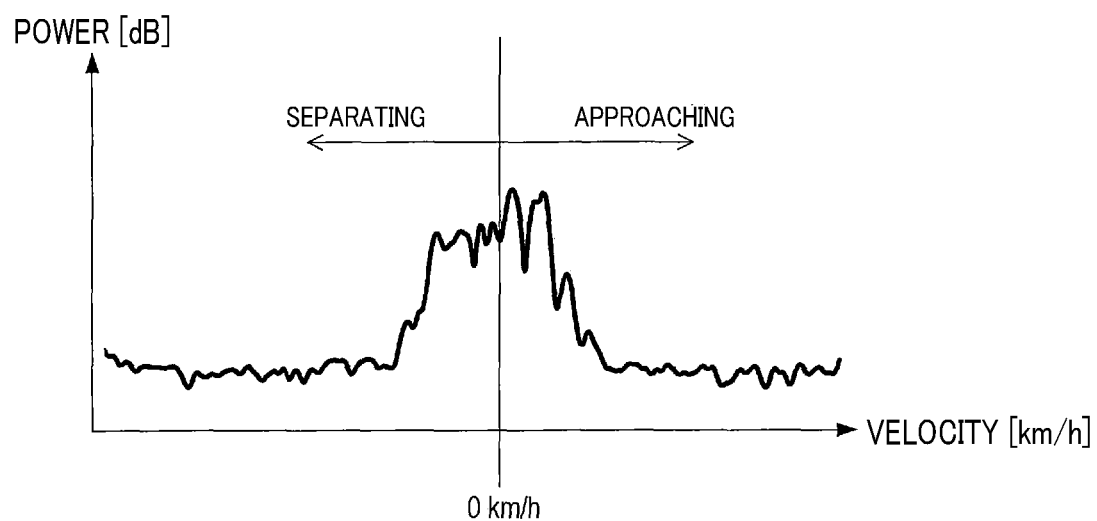
FIG. 4 is a graph illustrating a velocity-power spectrum of echo signals resulting from the rotor.

FIG. 4 is a graph illustrating an example of a velocity-power spectrum of echo signals resulting from the fan 75. In the dual FCW mode, because each frequency bin of the frequency-power spectrum corresponds to a relative velocity of the corresponding observed point, the frequency-power spectrum obtained in the dual FCW mode corresponds to the velocity-power spectrum. Because, as described above, the fan 75 has plural velocity components, the velocity-power spectrum may include plural power levels at respective relative velocities, which are higher than a predetermined power-level threshold; the relative velocities have a wide velocity range. This may result in the plural relative velocities being observed.

Figure 5:
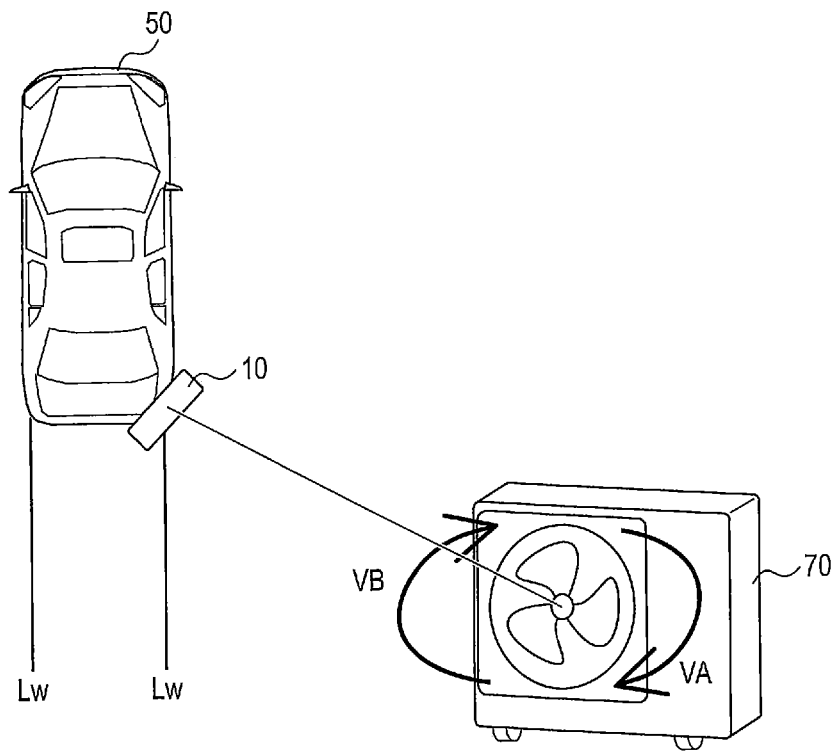
FIG. 5 is a view illustrating a relatively narrow range within which positions of respective portions of the rotor observed by a radar device installed in the vehicle are included.

For example, as illustrated in FIG. 5, a relative velocity VA relative to the vehicle 50 in a first direction approaching the vehicle 50 and a relative velocity VB relative to the vehicle 50 in a second direction moving away from the vehicle 50 are observed from the fan 75.

Figure 7:
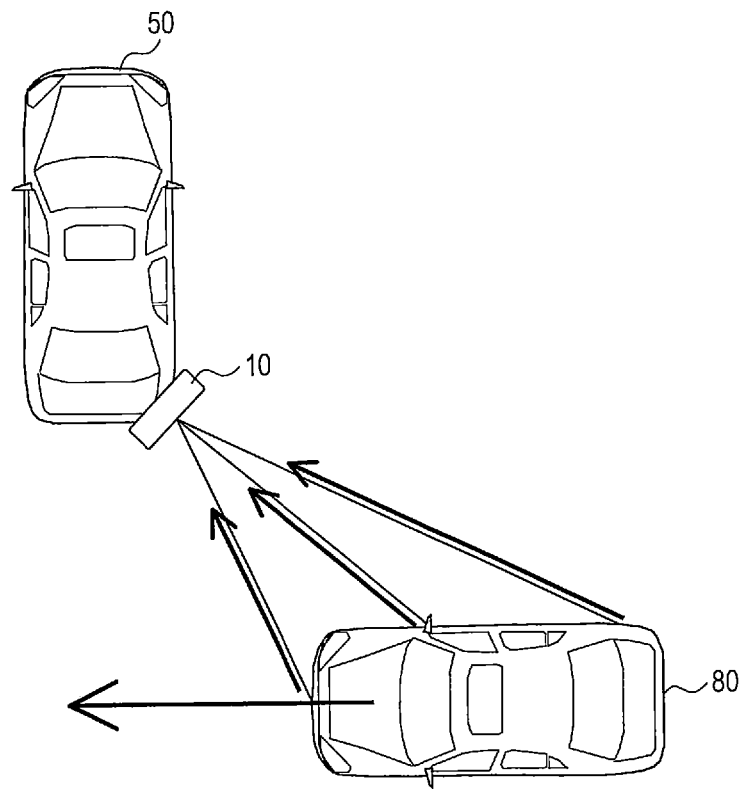
FIG. 7 is a view illustrating a relatively wide range within which positions of respective portions of an additional vehicle observed by the radar device installed in the vehicle are included.

In contrast, as illustrated in FIG. 7, an additional vehicle 80, which is laterally passing the rear side of the vehicle 50, has velocities relative to the vehicle 50 in a constant direction approaching the vehicle 50. The relative velocities of the additional vehicle 80 observed by the radar device 10 correspond to projected components of the velocities of the respective observed points resulting from the additional vehicle 80.

As illustrated in FIGS. 5 and 7, a first range within which the positions of the respective portions of the fan 75 are included is narrower than a second range within which the positions of respective portions of the additional vehicle 80, which is traveling at the rear side of the vehicle 50. The positions of the respective portions of the fan 75 are positions of the respective portions of the fan 75 relative to the own vehicle 50 when viewed from the vehicle 50. Similarly, the positions of the respective portions of the additional vehicle 80, which is traveling at the rear side of the vehicle 50, are positions of the respective portions of the additional vehicle 80 relative to the own vehicle 50 when viewed from the vehicle 50.

Specifically, the portions of the fan 75 have respective azimuths and respective distances relative to the vehicle 50 when viewed from the vehicle 50 and the portions of the additional vehicle 80 have respective azimuths and respective distances relative to the vehicle 50 when viewed from the vehicle 50. A first azimuth extent of the azimuths of the respective portions of the fan 75 is narrower than a second azimuth extent of the azimuths of the respective portions of the additional vehicle 80. Similarly, a first distance extent of the distances of the respective portions of the fan 75 is narrower than a second distance extent of the distances of the respective portions of the additional vehicle 80.

Figure 6:
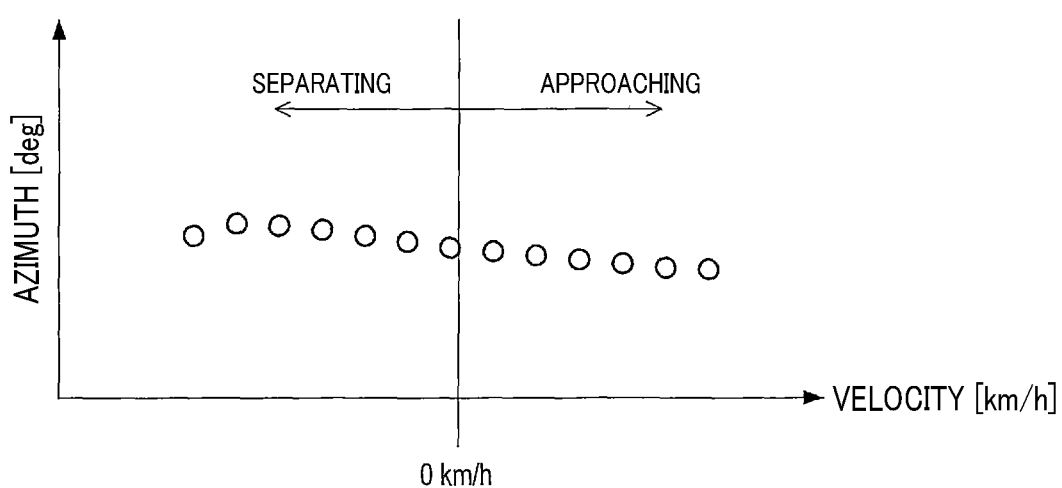
FIG. 6 is a schematic graph illustrating azimuths of respective observed points from the rotor with respect to the corresponding relative velocities of the respective observed points.

As illustrated in FIG. 6, the relative velocities of respective observed points from the fan 75 have a relatively wide extent, because the relative velocities of the respective observed points from the fan 75 include a first set of relative velocities in a first direction approaching the vehicle 50, and a second set of relative velocities in a second direction moving away from the vehicle 50.

In contrast, as described above, the azimuths of the respective observed points from the fan 75 have a relatively narrow extent (see FIG. 6). The observed points observed, i.e., observed, from the fan 75 include at least one observed point $\alpha$ and at least one observed point $\beta$; the at least one observed point $\alpha$ has an azimuth $\theta o$ and a relative velocity $V\alpha$, and the at least one observed point $\beta$ has the same azimuth $\theta o$ and a relative velocity $-V\alpha$. That is, the observed points observed, i.e., detected, from the fan 75 include at least one pair of an observed point $\alpha$ and an observed point $\beta$ that has (i) the same azimuth as that of the azimuth $\theta o$, and (ii) a relative velocity whose polarity is opposite to that of a relative velocity of the observed point $\beta$.

Because the positions of the respective observed points from the additional vehicle 80 have a relatively wide extent, the azimuths of the respective observed points from the additional vehicle 80 have a relatively wide extent (see FIG.

8). For this reason, the observed points observed, i.e., measured, from the additional vehicle 80 include no pairs of a first observed point and a second observed point that has (i) the same azimuth as the azimuth of the first observed point, and (ii) a relative velocity whose polarity is opposite to that of a relative velocity of the first observed point.

From this viewpoint, the mobile warning apparatus 30 is configured to eliminate, based on a difference between information items of respective observed points from a fixed rotor, such as the fan 75, and information items of respective observed points from a real warning target, the information items of the respective observed points from the fixed rotor.

Elimination Routine

Figure 9:
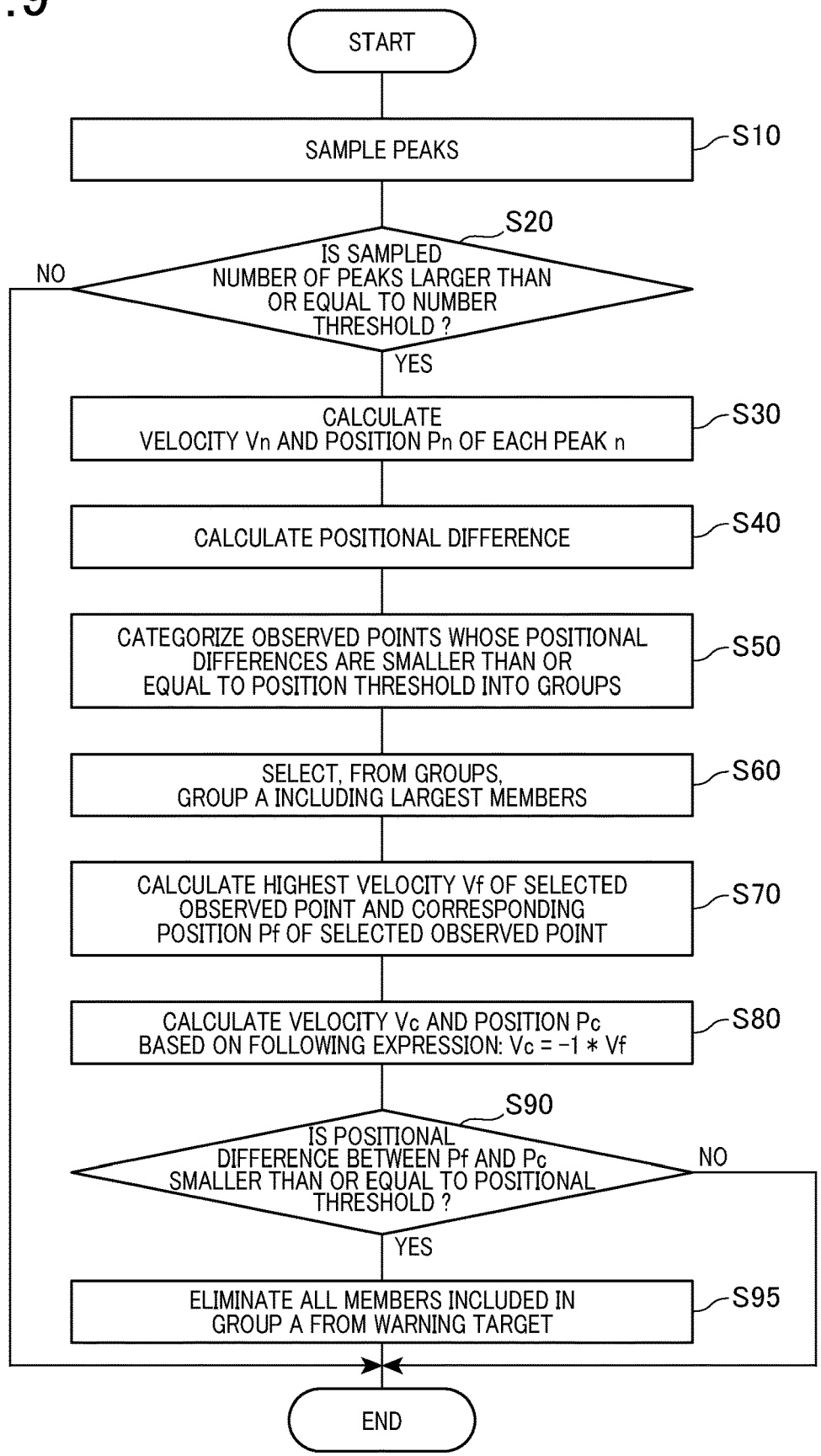
FIG. 9 is a flowchart illustrating an elimination routine from a warning target carried out by a mobile warning apparatus according to the first embodiment.

Next, the following describes the elimination routine carried out by the mobile warning apparatus 30 with reference to the flowchart of FIG. 9. The mobile warning apparatus 30 is programmed to cyclically perform the elimination routine.

Figure 10:
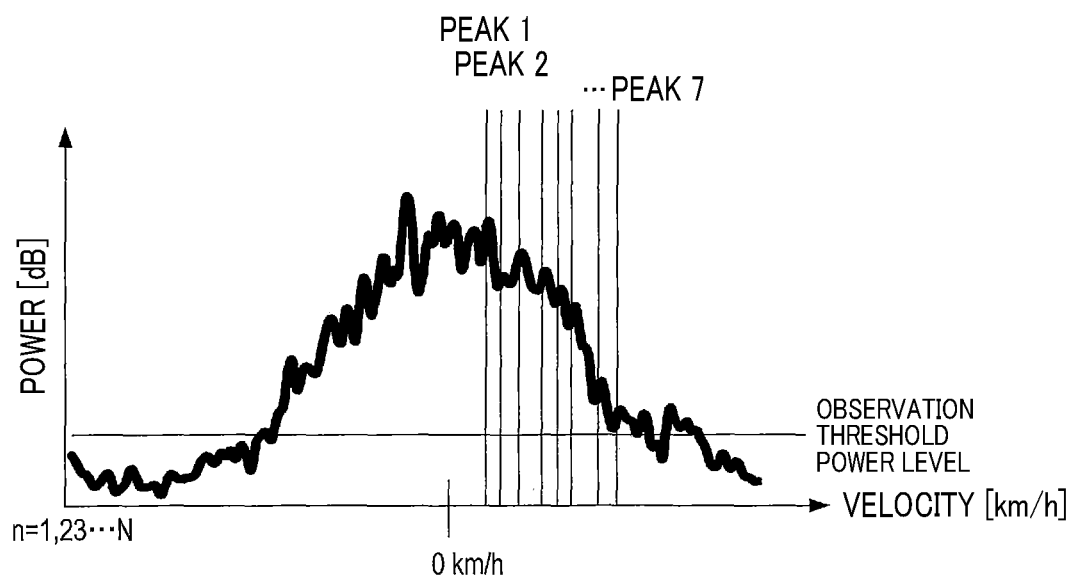
FIG. 10 is a graph illustrating a velocity-power spectrum and peaks sampled from the velocity-power spectrum.

In step S10 of the elimination routine, the mobile warning apparatus 30 samples, from a velocity-power spectrum observed by the radar device 10, peaks; each of the peaks represents a local peak power level that is higher than a predetermined observation threshold power level (see FIG. 10).

Next, the mobile warning apparatus 30 determines whether the number of peaks sampled in step S10 is larger than or equal to a predetermined number threshold in step S20. Because plural relative velocities are observed from a fixed rotor, the mobile warning apparatus 30 determines that the sampled peaks are unrelated to observed points from a fixed rotor in response to determination that the number of peaks sampled in step S10 is smaller than the predetermined number threshold (NO in step S20).

Otherwise, in response to determination that the number of peaks sampled in step S10 is larger than or equal to the predetermined number threshold (YES in step S20), the elimination routine proceeds to step S30.

At that time, let us assume that the number of peaks sampled in step S10 is represented as N. Each peak included in the N peaks will be referred to as a peak n.

In step S30, the mobile warning apparatus 30 calculates a relative velocity and a position of an observed point sampled as each peak n; the relative velocity and position of the observed point sampled as each peak n will be referred to as Vn and Pn. The mobile warning apparatus 30 calculates the position Pn of each observed point sampled as the corresponding peak n in accordance with the observed distance and observed azimuth of the corresponding observed point; the position Pn of each observed point sampled as the corresponding peak n has an X coordinate value and a Y coordinate value.

Next, the mobile warning apparatus 30 calculates, based on the positions Pn of the N observed points, positional differences of each of the N observed points, which serves as a reference point, from the respective other (N−1) observed points in step S40.

Figure 11:
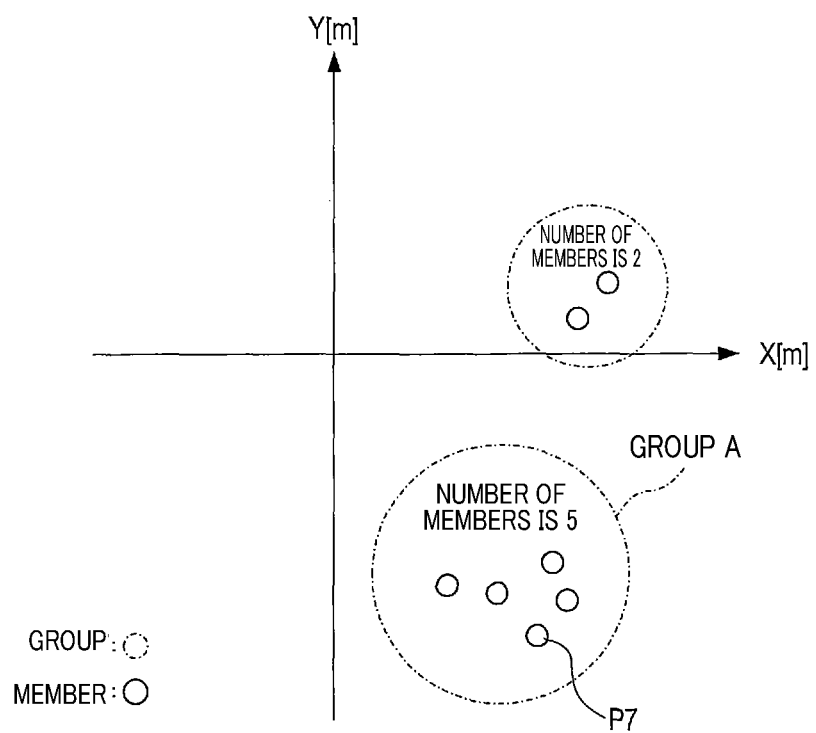
FIG. 11 is a graph illustrating groups, each of which includes categorized peaks that are located to be close to each other.

Following the operation in step S40, the mobile warning apparatus 30 categorizes the N observed points into plural proximity extent groups; the positions of respective plural observed points included in each proximity extent group are close to each other in step S50 (see FIG. 11).

Specifically, the mobile warning apparatus 30 determines plural reference points from the N observed points, and determines, for each reference point, a combination of observed points included in the N observed points such that the positional differences among all the observed points of the combination calculated in step S40 are smaller than or equal to a predetermined position threshold in step S50.

The plural points included in the combination for each reference point will be referred to as members. The position threshold is determined based on a predicted maximum positional difference that can be obtained from various types of fixed rotors, such as the outdoor condenser unit 70.

Following the operation in step S50, the mobile warning apparatus 30 compares the proximity extent groups generated in step S50 with each other to accordingly select, as an extent group A, one of the groups in step S60; the selected group has the largest number of the members included therein.

Next, the mobile warning apparatus 30 calculates a relative velocity Vf and a position Pf in step S70. The relative velocity Vf is the highest relative velocity in all the relative velocities of the respective observed points included in the extent group A, and the position Pf is the position of a selected one of the observed points included in the extent group A; the selected one of the observed points corresponds to the observed point having the highest relative velocity Vf.

Figure 12:
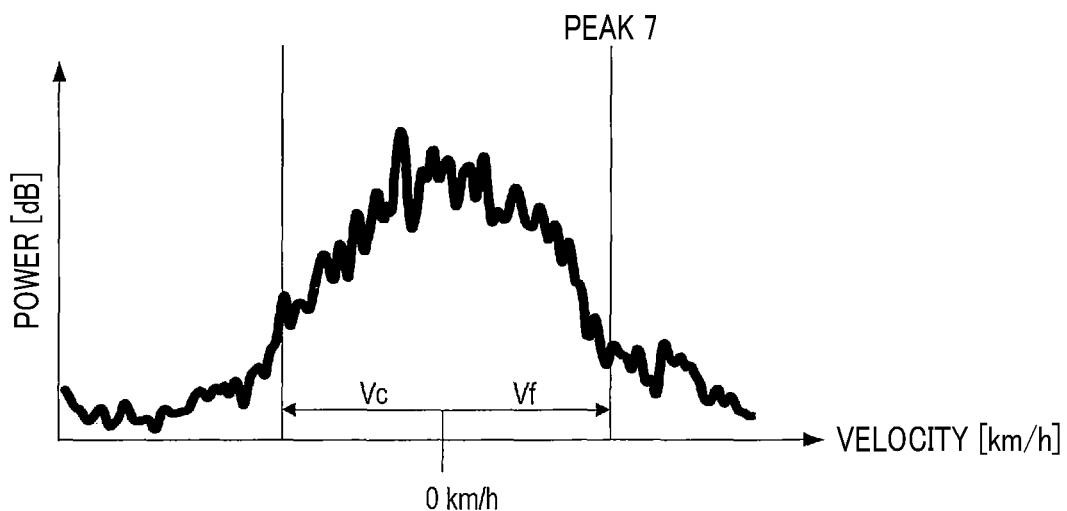
FIG. 12 is a graph illustrating, in the velocity-power spectrum, the highest relative velocity in a group and a corresponding relative velocity in the group, which is symmetric to the highest relative velocity about the relative velocity of 0 km/h.

FIGS. 11 and 12 illustrate an example where the peak 7 included in the extent group A has the highest relative velocity Vf.

In step S80, as illustrated in FIG. 12, the mobile warning apparatus 30 calculates a relative velocity Vc as a function of the relative velocity Vf calculated in step S70 in accordance with the following expression (1):

$$Vc = -1 \times Vf \qquad (1)$$

The relative velocity Vc corresponds to a velocity having (i) an absolute value that is the same as that of the relative velocity Vf and (ii) a polarity that is the opposite to the polarity, i.e., positive polarity, of the relative velocity Vf.

Figure 13:
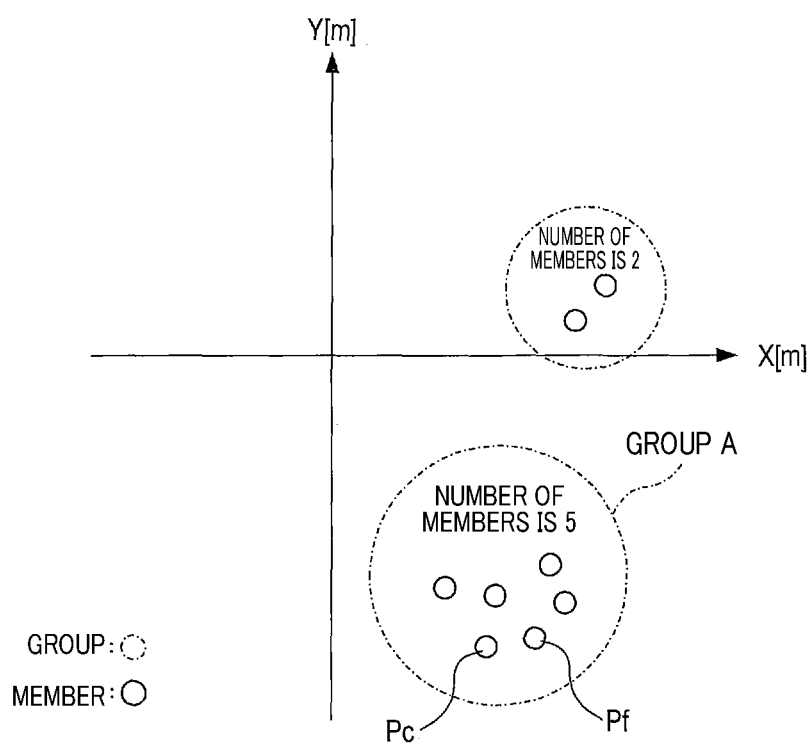
FIG. 13 is a graph illustrating, in the group, a first position of the highest relative velocity and a second position of the symmetric relative velocity.

In step S80, the mobile warning apparatus 30 calculates a position Pc of a peak at a corresponding observed point whose relative velocity corresponds to relative velocity Vc (see FIG. 13).

In step S80, if it is determined that there is no peak at a corresponding observed point whose relative velocity corresponds to relative velocity Vc, the mobile warning apparatus 30 calculates, as the position Pc, a peak at a corresponding observed point whose position is the closest to the position corresponding to the relative velocity Vc and whose relative velocity is closer to 0 km/h than a relative velocity of the position corresponding to the relative velocity Vc.

This prevents calculation of a position located outside of the observed points to accordingly reduce erroneous determination of a fixed rotor as a warning target.

Next, the mobile warning apparatus 30 determines whether the positional difference between the position Pf and the position Pc is smaller than or equal to the predetermined position threshold in step S90.

In other words, the mobile warning apparatus 30 determines whether a pair of a first relative velocity in the first direction approaching the vehicle 50 and a second relative velocity in the second direction moving away from the vehicle 50 is observed while the positional difference between a first position corresponding to the first relative velocity and a second position corresponding to the second relative velocity is maintained within the predetermined positional threshold in step S90.

Figure 8:
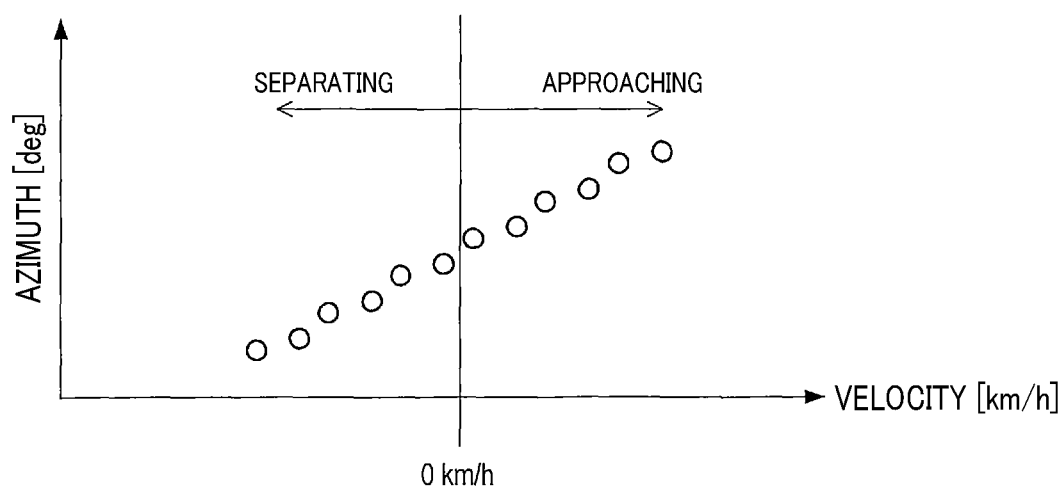
FIG. 8 is a schematic graph illustrating azimuths of respective observed points from the observed additional vehicle with respect to the corresponding relative velocities of the respective observed points.

If, as illustrated in FIG. 8, an absolute value of a relative velocity Vv observed from the additional vehicle 80 is relatively small, a positional difference between a position at which the relative velocity Vv is observed and a position at which a negative relative velocity (−Vv) is observed is relatively small. In contrast, the absolute value of a relative velocity Vv observed from the additional vehicle 80 is relatively large, a positional difference between a position at which the relative velocity Vv is observed and a position at which a negative relative velocity (−Vv) is observed is relatively large.

From this viewpoint, the mobile warning apparatus 30 uses the position Pf whose observed point has the highest relative velocity in all the relative velocities of the respective observed points included in the extent group A in step S90.

Figure 14:
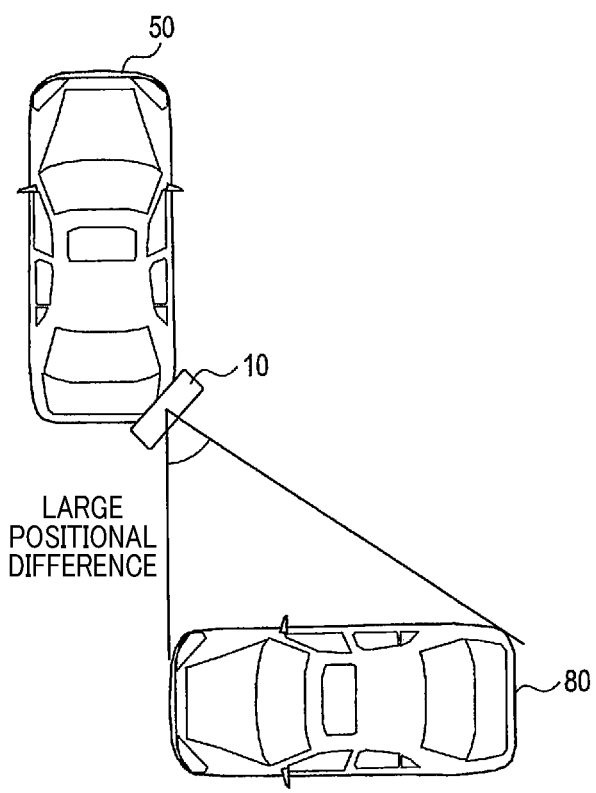
FIG. 14 is a view illustrating a relatively large positional difference between a selected pair of observed points from the additional vehicle laterally passing the rear side of the vehicle.
Figure 15:
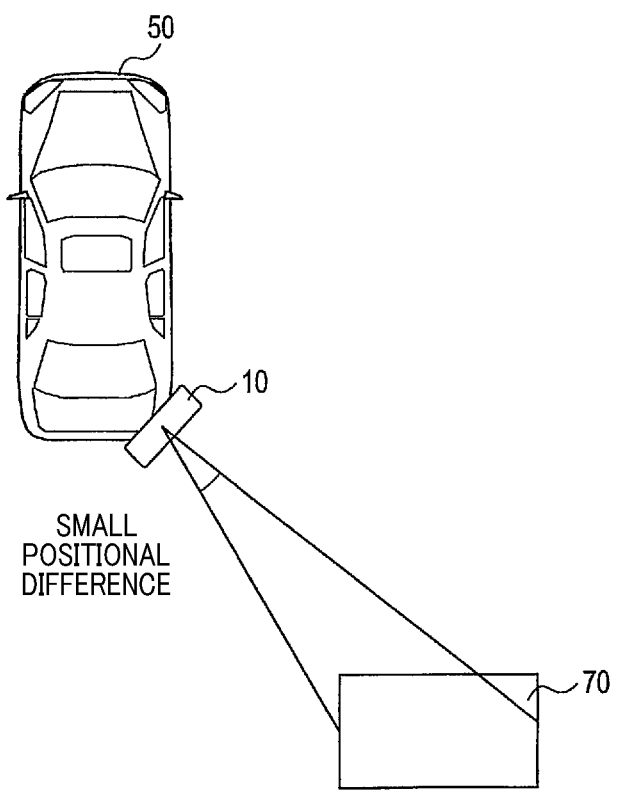
FIG. 15 is a view illustrating a relatively small positional difference between a selected pair of observed points from the rotor.

Let us assume that, as illustrated in FIGS. 14 and 15, the additional vehicle 80 is laterally passing the rear side of the vehicle 50. In this assumption, because the mobile warning apparatus 30 measures the total length of the additional vehicle 80, a positional difference between a position of the additional vehicle 80 at which a relative velocity Vv observed from the additional vehicle 80 and a position at which a negative relative velocity (−Vv) observed from the additional vehicle 80 is relatively large.

In contrast, the maximum length of a fixed rotor, such as the outdoor condenser unit 70, is shorter than the longitudinal length of the additional vehicle 80.

For this reason, a positional difference between a position of the additional vehicle 80 at which a relative velocity Vv is observed from the fixed rotor and a position at which a negative relative velocity (−Vv) is observed from the fixed rotor is relatively small.

From this viewpoint, the mobile warning apparatus 30 uses the observed point that has the highest relative velocity in all the relative velocities of the respective observed points included in the extent group A in step S90.

In response to determination that the positional difference between the position Pf and the position Pc is smaller than or equal to the predetermined position threshold (YES in step S90), the elimination routine proceeds to step S95. Otherwise, in response to determination that the positional difference between the position Pf and the position Pc is larger than the predetermined position threshold (NO in step S90), the mobile warning apparatus 30 terminates the elimination routine.

In step S95, the mobile warning apparatus 30 determines all the members, i.e., observed points, included in the extent group A as observed points from a fixed rotor, and eliminates all the members, i.e., observed points, as improper observed points from an improper warning target. Then, the mobile warning apparatus 30 terminates the elimination routine.

Specifically, the mobile warning apparatus 30 of the first embodiment serves as a velocity calculator and/or a position determiner to perform the operations in steps S10 to S90, and serves as an eliminator to perform the operation in step S95.

Beneficial Advantages

The first embodiment described set forth above achieves the following beneficial advantages.

The mobile warning apparatus 30 of the first embodiment, which is installed in the vehicle 50, is configured to determine whether plural relative velocities are observed by the radar device 10, and deter mine, in response to determination that the plural relative velocities are observed by the radar device 10, whether plural observed points corresponding to the respective observed relative velocities are in a predetermined proximity extent, i.e., a predetermined proximity range or region.

In response to determination that the plural observed points are in the predetermined proximity extent, the mobile warning apparatus 30 of the first embodiment is configured to deter mine that a fixed rotor is located in the predetermined proximity extent, and therefore eliminate the plural observed points as improper observed points from an improper warning target. This configuration of the mobile warning apparatus 30 reduces unnecessary issuance of a warning.

The mobile warning apparatus 30 of the first embodiment is configured to determine whether, of the plural observed points, there is at least one pair of a first relative velocity in a first direction approaching the vehicle 50 and a second relative velocity in a second direction moving away from the vehicle 50. This configuration makes it possible to more accurately determine whether the plural observed points are improper observed points from a fixed rotor.

The mobile warning apparatus 30 of the first embodiment is configured to categorize the plural observed points into plural proximity extent groups in accordance with the positional differences among the plural observed points. This configuration makes it possible to collectively eliminate at least one group of the observed points, which are determined to be observed from a fixed rotor as improper observed points.

Second Embodiment

Different of Second Embodiment from First Embodiment

The following describes a second embodiment of the present disclosure. Because the fundamental structure of the second embodiment is identical to that of the first embodiment except for the following points. The following therefore describes mainly the different points. Components of the second embodiment, which are identical to those of the first embodiment, respectively have common reference characters that are identical to those assigned to the corresponding components of the first embodiment.

In descriptions of the components of the second embodiment, which are respectively assigned with the common reference characters, descriptions of the corresponding components of the first embodiment are therefore employed, which are respectively assigned with the common reference characters.

The first embodiment is configured to categorize the N observed points into plural proximity extent groups in accordance with the positional differences among all the N observed points.

In contrast, the second embodiment is configured to categorize the N observed points into plural proximity extent groups in accordance with at least one of (i) the distance differences among all the N observed points and (ii) the azimuth differences among all the N observed points.

In particular, the mobile warning apparatus 30 of the second embodiment implements an azimuth threshold determiner and a distance threshold determiner in addition to the velocity calculator, location determiner, and eliminator.

Elimination Routine

Figure 16:
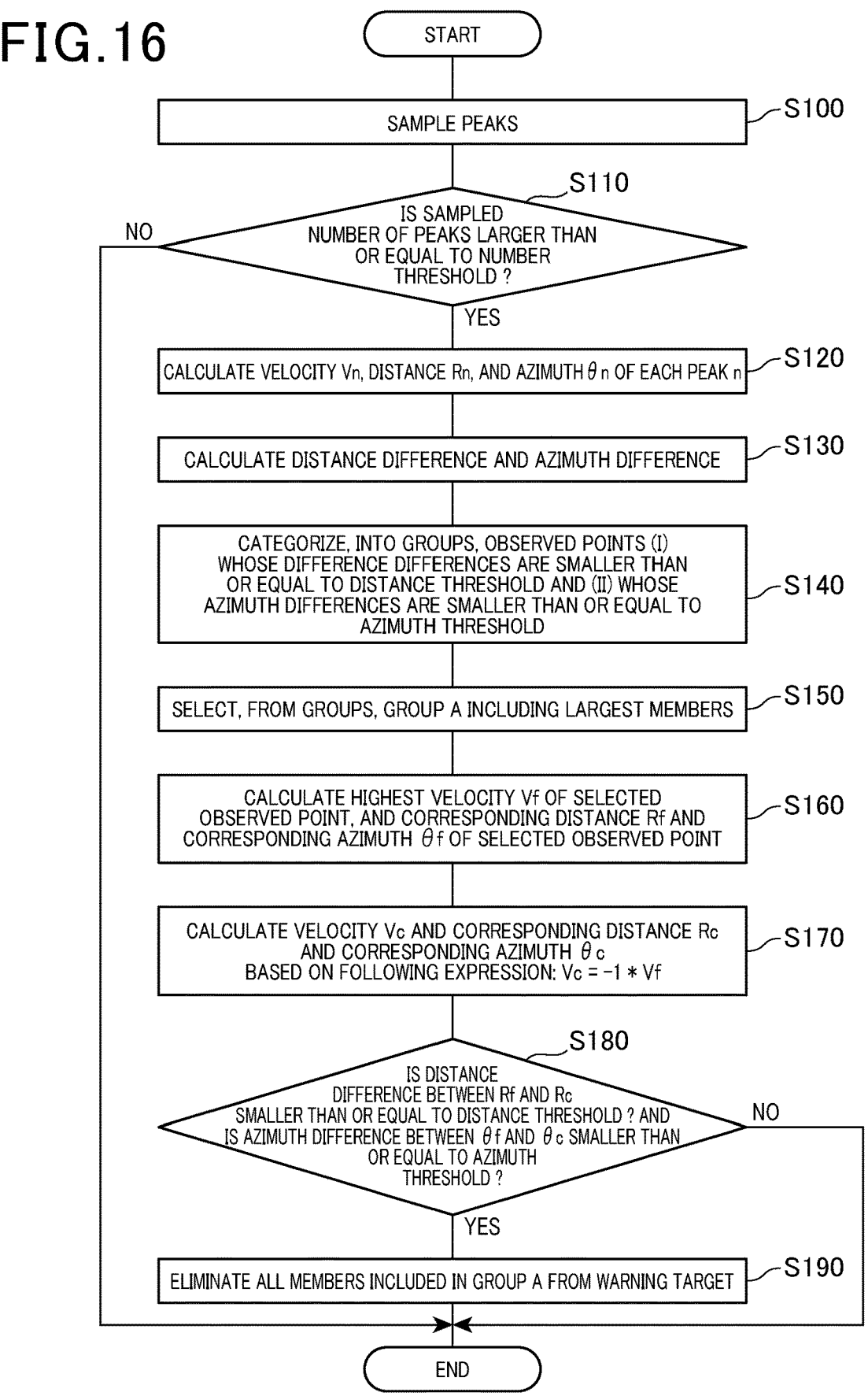
FIG. 16 is a flowchart illustrating an elimination routine from a warning target carried out by a mobile warning apparatus according to the second embodiment.

Next, the following describes an elimination routine carried out by the mobile warning apparatus 30 according to the second embodiment with reference to the flowchart of FIG. 16. The mobile warning apparatus 30 is programmed to cyclically perform the elimination routine.

When starting the elimination routine illustrated in FIG. 16, the mobile warning apparatus 30 sequentially performs an operation in step S100 and an operation in step S110, which are respectively identical to the operation in step S10 and the operation in step S20.

In step S120 in response to affirmative determination in step S110, the mobile warning apparatus 30 calculates, in addition to the relative velocity Vn of an observed point sampled as each peak n, the distance of the observed point sampled as each peak n relative to the vehicle 10 as a distance Rn, and the azimuth of the observed point sampled as each peak n relative to the vehicle 10 as an azimuth θn. As described above, reference character N represents the number of peaks sampled in step S100, and each peak included in the N peaks is expressed as a peak n.

Next, the mobile warning apparatus 30 calculates, based on the distances Rn of the N observed points, distance differences of each of the N observed points, which serves as a reference point, from the respective other (N−1) observed points in step S130. Additionally, the mobile warning apparatus 30 calculates, based on the azimuths θn of the N observed points, azimuth differences of each of the N observed points, which serves as the reference point, from the respective other (N−1) observed points in step S130.

Following the operation in step S130, the mobile warning apparatus 30 categorizes the N observed points into plural proximity extent groups; the distances of respective plural observed points included in each proximity extent group are close to each other and the azimuths of the respective plural observed points included in each proximity extent group are close to each other in step S140.

Specifically, the mobile warning apparatus 30 determines, in step S140, plural reference points from the N observed points, and determines, for each reference point, a combination of observed points included in the N observed points such that (1) The distance differences among all the observed points of the combination calculated in step S130 are smaller than or equal to a predetermined distance threshold
(2) The azimuth differences among all the observed points of the combination calculated in step S130 are smaller than or equal to a predetermined azimuth threshold Like the first embodiment, the plural points included in the combination for each reference point will be referred to as members.

The azimuth threshold can be set to a variable threshold. Specifically, the azimuth threshold determiner implemented by the mobile warning apparatus 30 can be configured to variably determine a value of the azimuth threshold for each group based on a distance of at least one observed point, such as the reference point, in the corresponding group.

Figure 17:
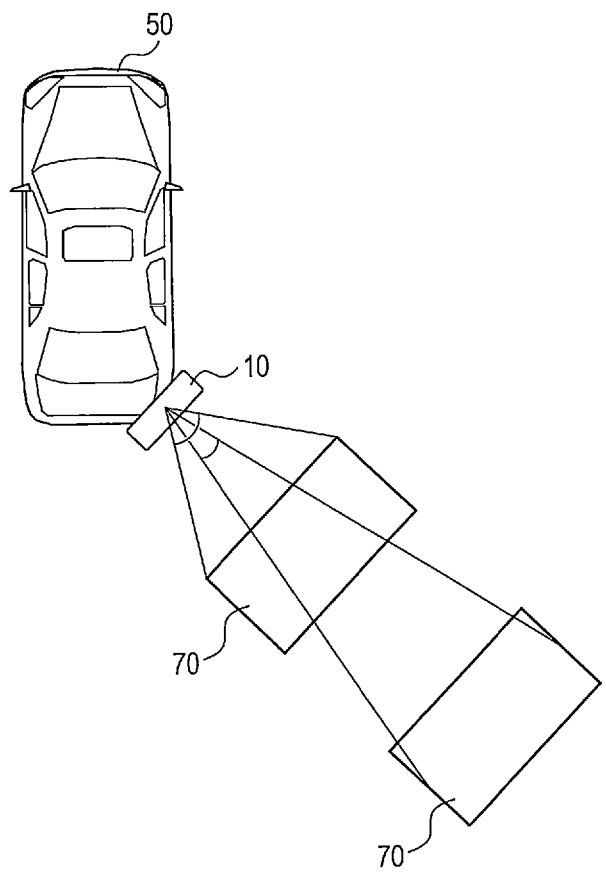
FIG. 17 is a view illustrating a situation where a spread angle of azimuths of respective observed points from the rotor varies with a distance of the rotor relative to the vehicle.

FIG. 17 illustrates a situation where the outdoor condenser unit 70 is located face-to-face with the radar device 10. This face-to-face location of the outdoor condenser unit 70 and the radar device 10 means that the radar device 10 and the outdoor condenser unit 70 are located such that the direction of radar-wave signals from the radar device 10 is substantially perpendicular to the plane of rotation of the fan 75 of the outdoor condenser unit 70.

Let us consider a first situation where the outdoor condenser unit 70 has a first distance from the vehicle 50 (see FIG. 18), and a second situation where the outdoor condenser unit 70 has a second distance from the vehicle 50 (see FIG. 19); the second distance is longer than the first distance.

Figure 18:
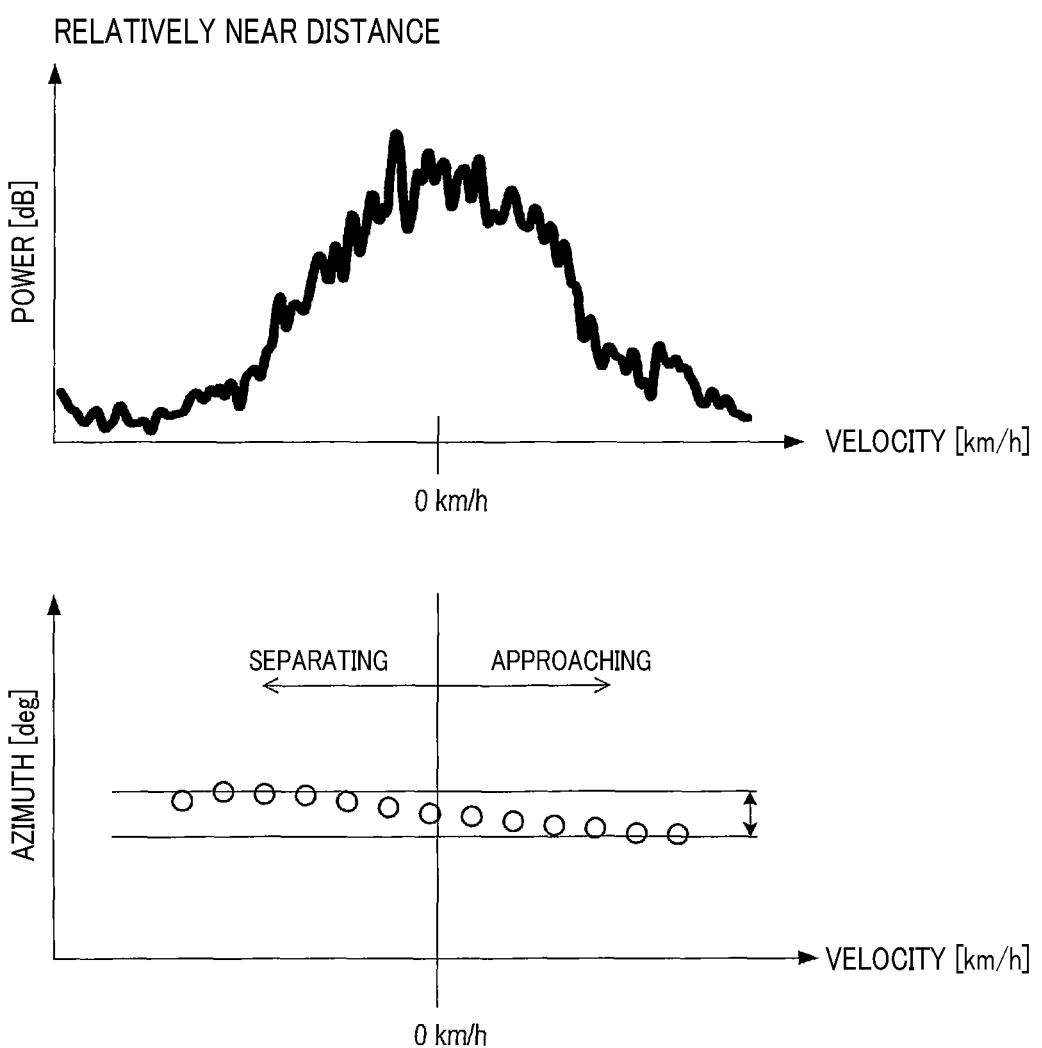
FIG. 18 is a joint diagram including, if a first distance between the vehicle and the rotor is relatively small, a first graph illustrating a velocity-power spectrum and a second graph illustrating azimuths of respective observed points from the rotor with respect to the corresponding relative velocities of the respective observed points.
Figure 19:
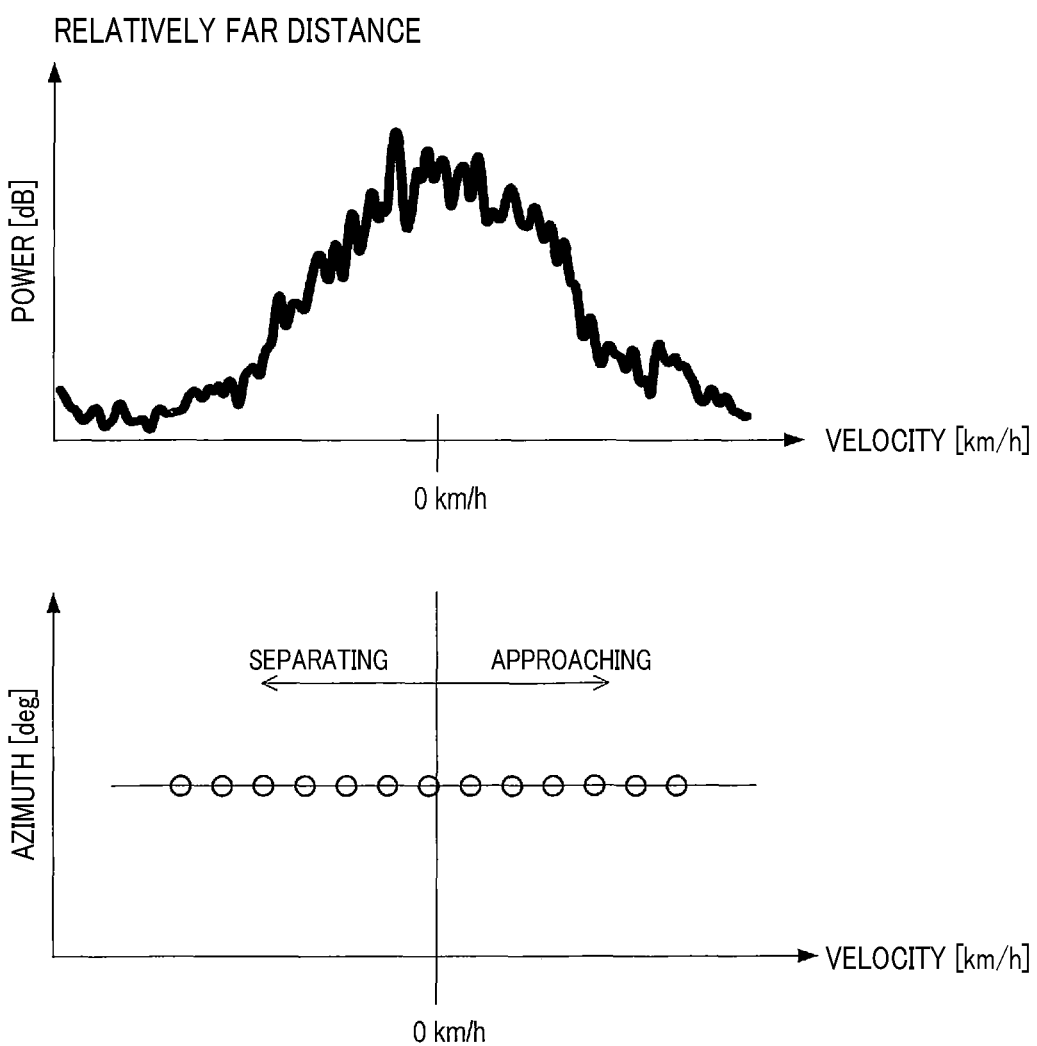
FIG. 19 is a joint diagram including, if a second distance between the vehicle and the rotor is relatively large, a first graph illustrating a velocity-power spectrum and a second graph illustrating azimuths of respective observed points from the rotor with respect to the corresponding relative velocities of the respective observed points.

FIGS. 18 and 19 show that the azimuths of respective observed points from the fan 75 in the first situation have a first spread angle, and the azimuths of respective observed points from the fan 75 in the second situation have a second spread angle; the first spread angle is wider than the second spread angle.

Figure 20:
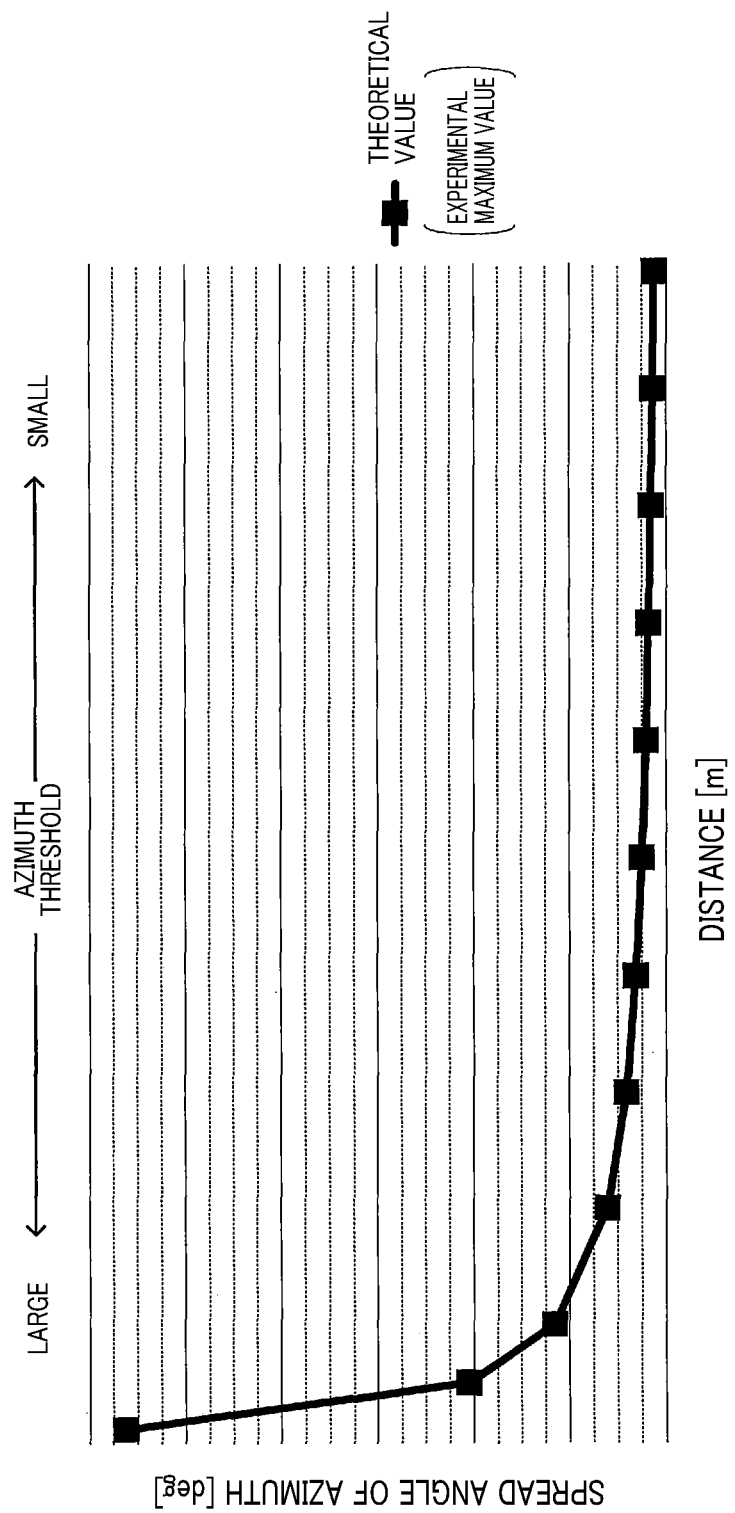
FIG. 20 is a graph illustrating how theoretical spread angles of azimuths of respective observed points from the rotor vary; each of the observed points has a corresponding one of distances.

FIG. 20 illustrates how theoretical spread angles of azimuths of respective observed points from the fan 75 are changed; each of the observed points has a corresponding one of distances. The theoretical spread angle of the azimuth of any observed point can be expressed in accordance with the following expression (2):

$$\alpha = \arctan(r/d) \times 2$$

where:
α represents the theoretical spread angle of the azimuth of any observed point;
r represents a fan radius; and
d represents an observed distance of the observed point.

The fan radius represents a length of each blade of the fan 75 in a corresponding radial direction.

Specifically, the azimuth threshold determiner implemented by the mobile warning apparatus 30 is configured to determine a value of the azimuth threshold for each group such that the value of the azimuth threshold increases as the observed distance between the vehicle 50 and the outdoor condenser unit 70 decreases. For example, the azimuth threshold determiner implemented by the mobile warning apparatus 30 is configured to calculate a value of the theoretical spread angle of the azimuth for each group in accordance with the expression (2), a maximum value of the fan radius assumed based on commercially available outdoor units, and a present value of at least one observed point included in the corresponding group.

The distance threshold can be set to a variable threshold. Specifically, the distance threshold determiner implemented by the mobile warning apparatus 30 can be configured to variably determine a value of the distance threshold for each group based on an echo intensity that at least one observed point, such as the reference point, has.

Figure 21:
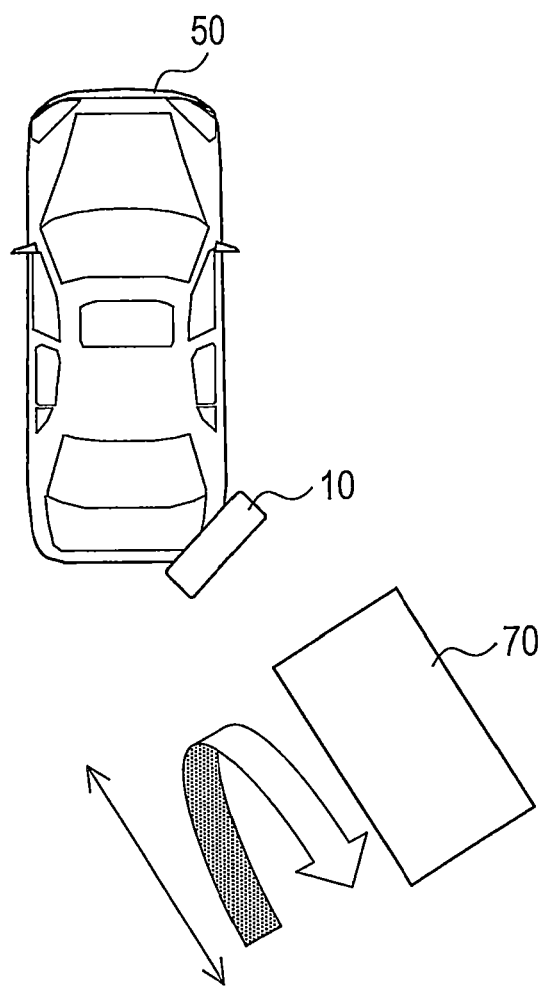
FIG. 21 is a view illustrating a relative location of the rotor relative to the vehicle when distances of observed points from the rotor have a widest dispersion.

FIG. 21 illustrates a situation where the fan 75 is located with one of the radial directions of the fan 75 being oriented toward the radar apparatus 10 of the vehicle 50. In this situation, the distances of observed points from the fan 75 have a widest dispersion.

In addition, as illustrated in FIG. 22, in the dual FCW mode, the lower the signal-to-noise ratio (S/N ratio) of an echo from an observed point, i.e., the lower the echo intensity from the observed point, the larger an error in the observed distance of the observed point.

Setting the distance threshold to a relatively large fixed value that is determined based on the lowest value of the S/N ratio might result in observed points, which actually result from an object other than a fixed rotor, being erroneously determined as observed points resulting from a fixed rotor. Otherwise, setting the distance threshold to a relatively small fixed value that is determined based on the highest value of the S/N ratio might result in observed points, which actually result from a fixed rotor, being erroneously not determined as observed points resulting from a fixed rotor. This might result in observed points from a fixed rotor being not eliminated as improper observed points.

From the above viewpoint, the distance threshold determiner implemented by the mobile warning apparatus 30 is configured to determine a value of the distance threshold for each group such that the value of the distance threshold increases as the echo intensity of, for example, the reference point in the corresponding group decreases. For example, the distance threshold determiner implemented by the mobile warning apparatus 30 is configured to calculate a value of the distance threshold for each group in accordance with the following expression (3):

$$\beta = di + e \quad (3)$$

where:
β represents the distance threshold;
di represents a diameter of the fan 75; and
e represents a distance error determined based on the S/N ratio of the echo of the reference point.

Following the operation in step S140, the mobile warning apparatus 30 compares the proximity extent groups generated in step S140 with each other to accordingly select, as an extent group A, one of the groups in step S150; the selected group has the largest number of the members included therein.

Next, the mobile warning apparatus 30 calculates a relative velocity Vf and a distance Rf, and an azimuth θf in step S160. The relative velocity Vf is the highest relative velocity in all the relative velocities of the respective observed points included in the extent group A. Each of the distance Rf and azimuth θf is a corresponding one of the distance and azimuth of a selected one of the observed points included in the extent group A; the selected one of the observed points corresponds to the observed point having the highest relative velocity Vf.

In step S170, the mobile warning apparatus 30 calculates a relative velocity Vc as a function of the relative velocity Vf calculated in step S160 in accordance with the above expression (1), which is represented as Vc=−1×Vfa.

The relative velocity Vc corresponds to a velocity having (i) an absolute value that is the same as that of the relative velocity Vf and (ii) a polarity that is the opposite to the polarity, i.e., positive polarity, of the relative velocity Vf.

In step S170, the mobile warning apparatus 30 calculates a distance Rc and an azimuth θc of a peak at a corresponding observed point whose relative velocity corresponds to relative velocity Vc.

Next, the mobile warning apparatus 30 determines whether the distance difference between the distance Rf and the distance Rc is smaller than or equal to the predetermined distance threshold and whether the azimuth difference between the azimuth θf and the azimuth θc is smaller than or equal to the predetermined azimuth threshold in step S180.

In other words, the mobile warning apparatus 30 determines whether a pair of a first relative velocity in the first direction approaching the vehicle 50 and a second relative velocity in the second direction moving away from the vehicle 50 is observed while
(i) The distance difference between a first distance corresponding to the first relative velocity and a second distance corresponding to the second relative velocity is maintained within the predetermined distance threshold
(ii) The azimuth difference between a first azimuth corresponding to the first relative velocity and a second azimuth corresponding to the second relative velocity is maintained within the predetermined azimuth threshold In response to determination that the distance difference between the distance Rf and the distance Rc is smaller than or equal to the predetermined distance threshold and that the azimuth difference between the azimuth θf and the azimuth θc is smaller than or equal to the predetermined azimuth threshold (YES in step S180), the elimination routine proceeds to step S190. Otherwise, in response to determination that the distance difference between the distance Rf and the distance Rc is larger than the predetermined distance threshold and/or the azimuth difference between the azimuth θf and the azimuth θc is larger than the predetermined azimuth threshold (NO in step S180), the mobile warning apparatus 30 terminates the elimination routine.

In step S190, the mobile warning apparatus 30 determines that all the members, i.e., observed points, included in the extent group A as observed points from a fixed rotor, and eliminates all the members, i.e., observed points, as improper observed points from an improper warning target. Then, the mobile warning apparatus 30 terminates the elimination routine.

The operation in step S120 calculates both the distance and azimuth of the observed point sampled as each peak n relative to the vehicle 10, but can calculate at least one of the distance and azimuth of the observed point sampled as each peak n relative to the vehicle 10.

If the operation in step S120 is programmed to calculate only the distance of the observed point sampled as each peak n relative to the vehicle 10, the operation in step S130 is programmed to calculate only the distance differences of each N observed point, and the operation in step S140 is programmed to categorize the N observed points into plural proximity extent groups; the distances of respective plural observed points included in each proximity extent group are close to each other independently of the azimuths of the respective plural observed points. Similarly, the operation in step S160 is programmed to calculate the relative velocity Vf and the distance Rf without calculating the azimuth θf, and the operation in step S170 is programmed to calculate the distance Rc of the peak at the corresponding observed point whose relative velocity corresponds to relative velocity Vc without calculating the azimuth θc of the peak at the corresponding observed point whose relative velocity corresponds to relative velocity Vc. The operation in step S180 is programmed to perform only determination of whether the distance difference between the distance Rf and the distance Rc is smaller than or equal to the predetermined distance threshold.

Similarly, if the operation in step S120 is programmed to calculate only the azimuth of the observed point sampled as each peak n relative to the vehicle 10, the operation in step S130 is programmed to calculate only the azimuth differences of each N observed point, and the operation in step S140 is programmed to categorize the N observed points into plural proximity extent groups; the azimuths of respective plural observed points included in each proximity extent group are close to each other independently of the distances of the respective plural observed points. Similarly, the operation in step S160 is programmed to calculate the relative velocity Vf and the azimuth θf without calculating the distance Rf, and the operation in step S170 is programmed to calculate the azimuth θc of the peak at the corresponding observed point whose relative velocity corresponds to relative velocity Vc without calculating the distance Rc of the peak at the corresponding observed point whose relative velocity corresponds to relative velocity Vc. The operation in step S180 is programmed to perform only determination of whether the azimuth difference between the azimuth θf and the azimuth θc is smaller than or equal to the predetermined azimuth threshold.

Specifically, the mobile warning apparatus 30 of the second embodiment serves as a distance calculator and/or a position determiner to perform the operations in steps S100 to S180, and serves as an eliminator to perform the operation in step S190.

Beneficial Advantages

The second embodiment described set forth above achieves the following beneficial advantages in addition to the above beneficial advantages achieved by the first embodiment.

The mobile warning apparatus 30 of the second embodiment is configured to deter mine whether plural observed points are in a predetermined proximity extent in accordance with at least one of the distance differences among the plural observed points and the azimuth differences among the plural observed points. This makes it possible to determine whether the observed points are observed from a fixed rotor in accordance with at least one of the distance differences among the plural observed points and the azimuth differences among the plural observed points in place of the positional differences among the plural observed points.

The mobile warning apparatus 30 of the second embodiment is configured to determine a value of the azimuth threshold, which is used for determination of whether plural observed points are observed from a fixed rotor, in accordance with the distance of at least one of the plural observed points. This makes it possible to determine whether the plural observed points are observed from a fixed rotor with higher accuracy.

The mobile warning apparatus 30 of the second embodiment is configured to determine a value of the distance threshold, which is used for determination of whether plural observed points are observed from a fixed rotor, in accordance with the echo intensity of at least one of the plural observed points. This makes it possible to determine whether the plural observed points are observed points from a fixed rotor with higher accuracy.

Modifications

The first and second embodiments for implementing the present disclosure have been described, but the present disclosure is not limitedly interpreted as the first and second embodiments, but can be variously modified for example as follows.

Each of the first and second embodiments describes situations where the fan of an outdoor condenser unit is located around the vehicle 50 as an example of a fixed rotor, but the fixed rotor is not limited to the fan of an outdoor condenser. The fixed rotor can be, for example, the fan of an outdoor fan device or the rotor of an outdoor power generator.

The mobile warning apparatuses 30 and their warning methods described in the present disclosure can be implemented by a dedicated computer including a memory and a processor programmed to perform one or more functions embodied by one or more computer programs.

The mobile warning apparatuses 30 and their warning methods described in the present disclosure can also be implemented by a dedicated computer including a processor comprised of one or more dedicated hardware logic circuits.

The mobile warning apparatuses 30 and their warning methods described in the present disclosure can further be implemented by a dedicated computer system comprised of a memory, a processor programmed to perform one or more functions embodied by one or more computer programs, and one or more hardware logic circuits.

The one or more programs can be stored in a non-transitory storage medium as instructions to be carried out by a processor. The functions of each unit included in each of the mobile warning apparatuses 30 can be implemented by software or at least one hardware devices.

The functions of one element in each of the first and second embodiments can be distributed as plural elements, and the function of one element can be implemented by plural elements. The functions that plural elements have can be implemented by one element, and the function implemented by plural elements can be implemented by one element. At least part of the structure of each of the first and second embodiments can be eliminated. At least part of one of the first and second exemplary embodiments can be added to the structure of the other of the first and second embodiments, or can be replaced with a corresponding part of the other of the first and second embodiments.

The present disclosure can be implemented by various embodiments in addition to the mobile warning apparatuses 30; the various embodiments include (i) systems each include one of the mobile warning apparatuses 30, (ii) programs for causing a computer to serve as one of the mobile warning apparatuses 30, (iii) non-transitory storage media storing the programs, and mobile object detecting methods.

What is claimed is:

1. A mobile warning apparatus for issuing a warning in response to observation of a mobile object approaching a vehicle, the mobile warning apparatus comprising:
    a velocity calculator configured to calculate, based on observation information observed by a sensor installed in the vehicle, one or more relative velocities of one or more observed points;
    a position determiner configured to perform:
        a first determination of whether the observed points include a pair of first and second observed points, the first observed point having a first relative velocity in a first direction approaching the vehicle, and the second observed point having a second relative velocity in a second direction moving away from the vehicle;
        a second determination of whether a difference between azimuths of the respective first and second observed points of the pair relative to the vehicle observed by the sensor is smaller than or equal to a predetermined azimuth threshold in response to the first determination that the observed points include the pair of the first observed point and the second observed point; and
        a third determination that the first and second observed points of the pair are observed points obtained from a fixed rotor in response to the second determination that the difference between the azimuths of the respective first and second observed points of the pair relative to the vehicle observed by the sensor is smaller than or equal to the predetermined azimuth threshold; and
    an eliminator configured to eliminate the first and second observed points from a warning target.

2. The mobile warning apparatus according to claim 1, wherein:
    the position determiner is configured to:
        determine whether a difference between positions of the respective first and second observed points of the pair observed by the sensor is smaller than or equal to a predetermined position threshold in response to determination that the observed points includes the pair of the first observed point and the second observed point; and determine that the first and second observed points of the pair are observed points obtained from the fixed rotor in response to determination that the difference between the positions of the respective first and second observed points of the pair observed by the sensor is smaller than or equal to the predetermined position threshold.

3. The mobile warning apparatus according to claim 1, wherein:

the position determiner is configured to:

determine whether a difference between distances of the respective first and second observed points of the pair relative to the vehicle observed by the sensor is smaller than or equal to a predetermined distance threshold; and determine that the first and second observed points are observed points obtained from the fixed rotor in response to determination that the difference between the distances of the respective first and second observed points relative to the vehicle observed by the sensor is smaller than or equal to the predetermined distance threshold.

4. The mobile warning apparatus according to claim 1, further comprising:

an azimuth threshold determiner configured to determine a value of the azimuth threshold as a function of a distance of at least one observed point relative to the vehicle, the at least one observed point being included in the observed points.

5. The mobile warning apparatus according to claim 3, further comprising:

a distance threshold determiner configured to determine a value of the distance threshold as a function of an echo intensity of at least one observed point included in the observed points.

* * * * *